United States Patent [19]

Liu et al.

[11] 4,004,103
[45] Jan. 18, 1977

[54] PATH-FINDING SCHEME FOR A MULTISTAGE SWITCHING NETWORK

[75] Inventors: Chao Kai Liu, Matawan; Douglas Charles Smith, Locust, both of N.J.

[73] Assignee: Bell Telephone Laboratories, Incorporated, Murray Hill, N.J.

[22] Filed: Oct. 15, 1975

[21] Appl. No.: 622,516

[52] U.S. Cl. .................. 179/18 EA; 179/18 GF
[51] Int. Cl.² .................. H04Q 3/42; H04Q 3/56
[58] Field of Search ..... 179/18 GE, 18 GF, 18 EA, 179/18 AB

[56] References Cited
UNITED STATES PATENTS

| | | | |
|---|---|---|---|
| 3,415,955 | 12/1968 | Singer | 179/18 GF |
| 3,485,956 | 12/1969 | Jorgensen et al. | 179/18 GE |
| 3,536,842 | 10/1970 | Ewin et al. | 179/18 EA |
| 3,576,398 | 4/1971 | Ris-Oranjis et al. | 179/18 EA |
| 3,655,918 | 4/1972 | Marbury et al. | 179/18 GF |

*Primary Examiner*—Thomas A. Robinson
*Attorney, Agent, or Firm*—Roy C. Lipton

[57] ABSTRACT

A plurality of idle paths through a multistage switching network which are capable of establishing a connection between a particular line and a particular trunk are identified. Repeated selection of paths identified as idle, but actually out-of-service, is avoided by selecting successively different ones of the identified idle paths in a pseudorandom manner to complete the connection between the line and the trunk. The pseudorandom path selection is accomplished in response to predetermined portions of a pseudorandom pattern of binary bits.

10 Claims, 6 Drawing Figures

PATH-FINDING SCHEME FOR A MULTISTAGE SWITCHING NETWORK

FIELD OF THE INVENTION

This invention relates to switching networks and more particularly to the identification and selection of idle paths through a multistage switching network.

DESCRIPTION OF THE PRIOR ART

Multistage switching networks are well known in the art. Such networks have a plurality of lines terminating at an input switching stage, at least one intermediate switching stage and a plurality of trunks terminating at an output switching stage. Each switching stage has a plurality of input and output terminals and the output terminals of one switching stage are connected to the input terminals of an adjacent switching stage via sets of interstage links.

A requirement for multistage switching networks is the identification and selection of idle paths through the network so that a particular line may be connected to a particular trunk. Various methods exist in the prior art to accomplish path identification and selection. One such method involves the insertion of a magnetic core in series with each interstage link. The magnetic core is placed in a first state in response to a busy interstage link and in a second state in response to an idle interstage link. Control circuitry selects a predetermined subset of the interstage links which form all possible paths through the network for a particular line and trunk. The magnetic cores associated with the subset of interstage links are interrogated to determine which interstage links are busy and which interstage links are idle. The control circuitry then selects a particular combination of the idle interstage links to form a complete path through the network.

The prior art method described above employs a deterministic scheme of path selection. That is, for any ordered set of idle interstage links a preference chain circuit is employed to always choose the lowest numbered idle path available from among the set of idle interstage links. A problem results with such a fixed method of path selection if the particular path selected is erroneously indicated as being idle and is actually out-of-service. When this occurs, the attempted connection will not be completed and, if reattempted, the same lowest numbered idle path will again be selected from the ordered set of interstage links. However, as this particular path is out-of-service and is erroneously indicated at being idle, the attempted connection will again not be completed. This process could then be repeated resulting in an out-of-service path being repeatedly selected and preventing the desired connection from being completed through the network.

It is therefore a broad object of this invention to achieve a nondeterministic method of path selection in a multistage switching network.

It is a further object of this invention to prevent the repeated selection of an out-of-service path through a multistage switching network.

SUMMARY OF THE INVENTION

In accordance with a feature of the invention, idle paths through a multistage switching network between a particular line and trunk are identified, and successively different ones of the identified idle paths are selected in a pseudorandom manner to complete a connection between the line and the trunk.

It is a feature of the invention that the pseudorandom path selection is accomplished in response to predetermined portions of a pseudorandom pattern of binary bits.

It is another feature of the invention that the first idle path identified from among the plurality of idle paths is selected in response to a first portion of the pseudorandom pattern.

It is a further feature of the invention that in response to a second portion of the pseudorandom pattern the first idle path identified is rejected, and the second idle path identified is selected, and in response to a third portion of the pseudorandom pattern, the first and second idle paths identified are rejected, and the third idle path identified is selected.

The foregoing and other objects and features will be more fuly understood from the following description of an illustrative embodiment thereof taken in conjunction with the accompanying drawings.

DETAILED DESCRIPTION

Figure 1:
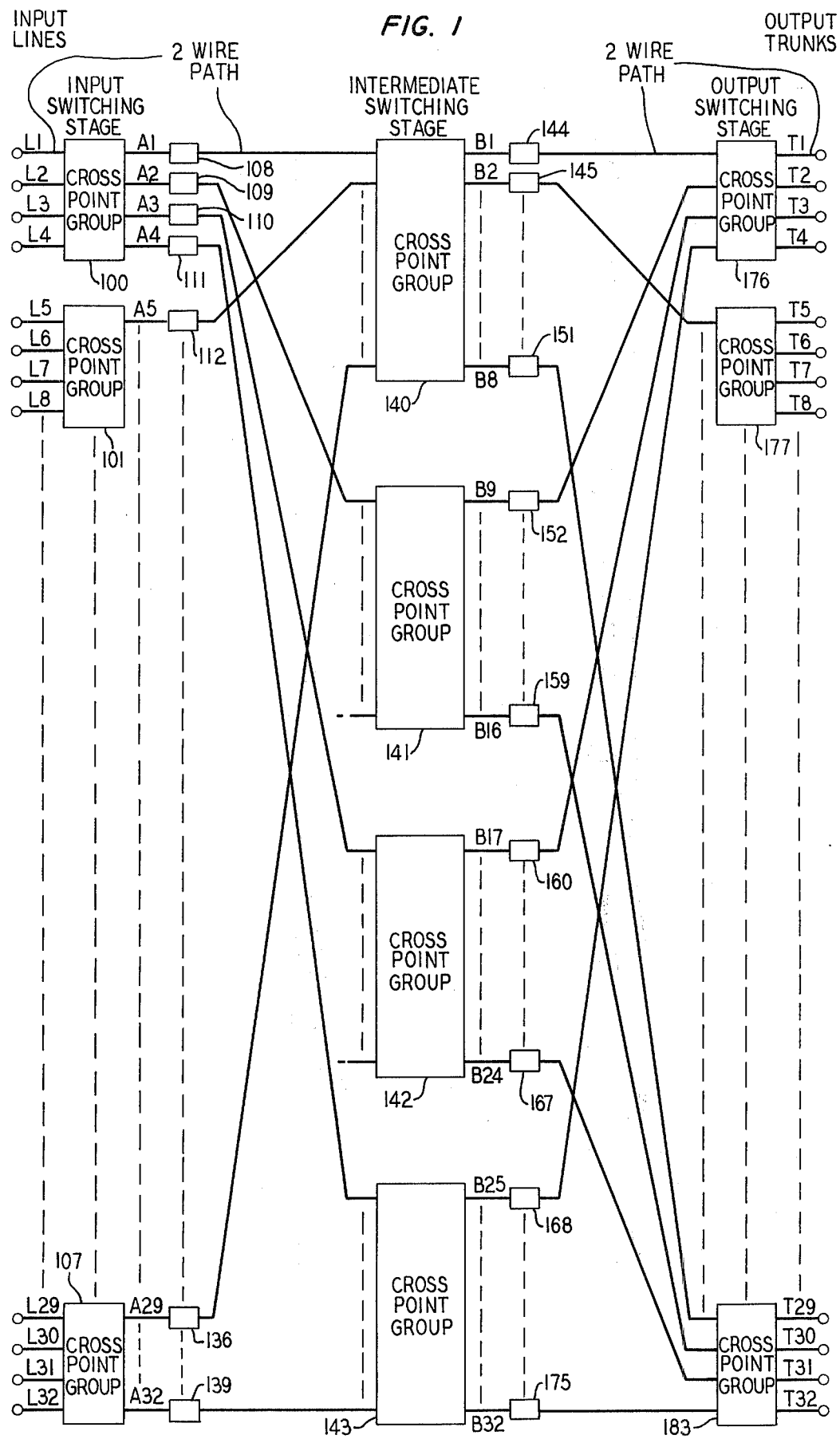
FIG. 1 discloses, in block diagram form, a multistage switching network.

Refer to FIG. 1. Therein is shown a multistage switching network consisting of an input switching stage, an intermediate switching stage and an output switching stage. The input switching stage is comprised of crosspoint groups 100 through 107 at which is terminated incoming lines L1 through L32. The output switching stage is comprised of crosspoint groups 176 through 183 at which is terminated outgoing trunks T1 through T32. The intermediate switching stage is comprised of crosspoint groups 140 through 143. Each crosspoint group in the intermediate switching stage is connected to each and every crosspoint group in the input switching stage via a first set of interstage links, the various ones of the links of the several first sets being identified as interstage links A1 through A32. Similarly, each crosspoint group in the intermediate switching stage is connected to each and every crosspoint group in the output switching stage via a second set of interstage links identified as interstage links B1 through B32. Connected in series with each interstage link are a plurality of optical-isolator elements identified as optical-isolator elements 108 through 139 and 144 through 175. The optical-isolator elements will be described in greater detail hereinafter.

Figure 2:
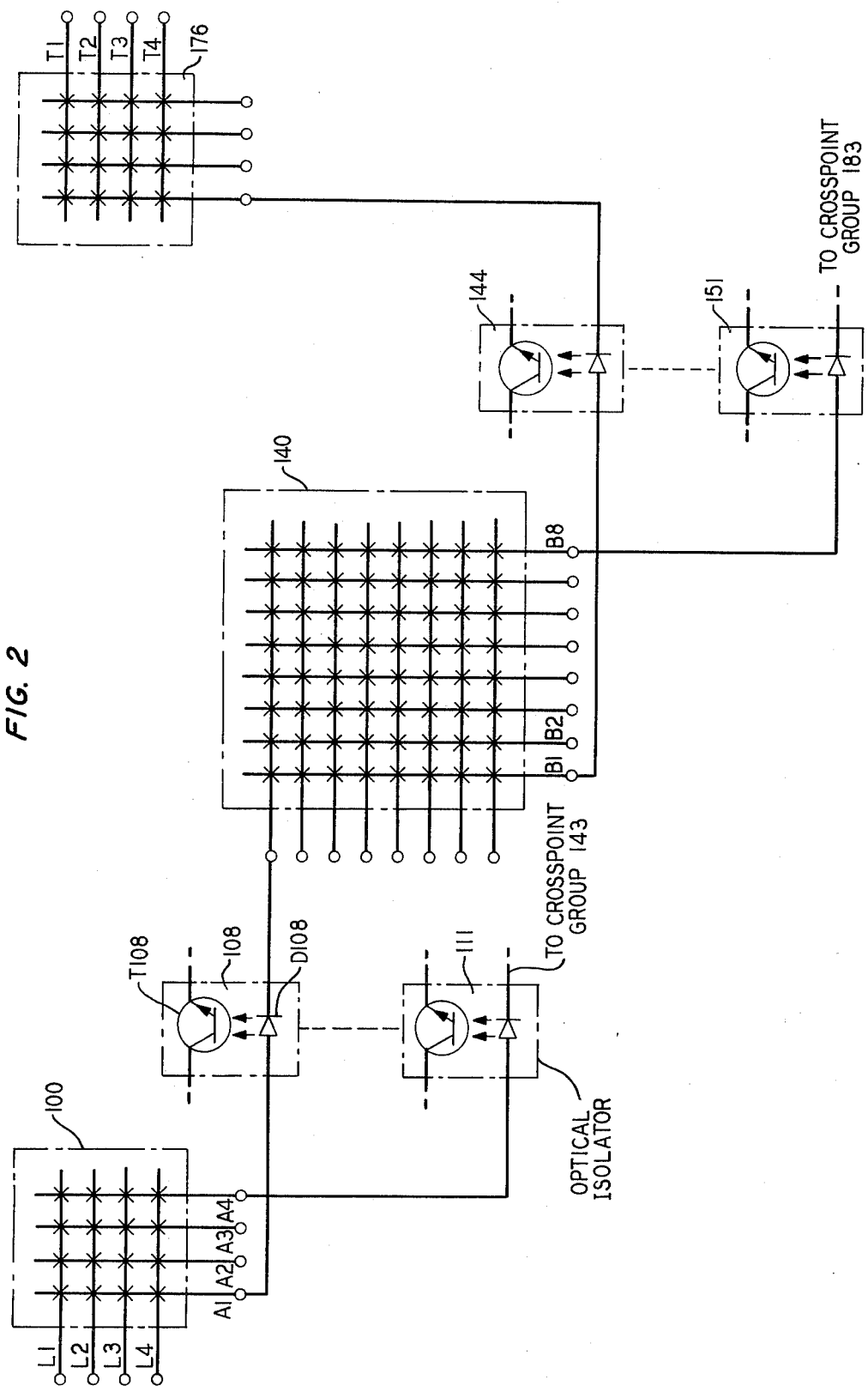
FIG. 2 discloses in greater detail various components of the multistage switching network.

Refer to FIG. 2. Therein is shown in greater detail, a crosspoint group from each switching stage and the associated optical-isolator elements. The crosspoint groups 100, 140 and 176, shown in FIG. 2 are represented by a plurality of vertical paths intersected by a plurality of horizontal paths. Each vertical and horizontal path is intended to symbolize a plurality of conductors and each intersection or crosspoint (marked by X) of a vertical path with a horizontal path is intended to symbolize a plurality of circuit establishing devices, such as relay contacts, PNPN devices, etc., whereby electrically conductive paths may be selectively set up between the corresponding conductors represented by any vertical path and any horizontal path. Establishing selective connections in this manner allows a path to be established between any incoming line and any outgoing trunk in the switching network via the various interstage links and crosspoint groups.

Although only one crosspoint group is shown in detal from each switching stage, it is to be understood that crosspoint groups 101–107 from the input switching stage are identical to crosspoint group 100 as illustrated, crosspoint groups 141–143 from the intermediate switching stage are identical to crosspoint group 140 as illustrated, and crosspoint groups 177–183 from the output switching stage are identical to crosspoint group 176 as illustrated.

Also shown in FIG. 2 are optical-isolator elements 108, 111, 144, and 151. These elements are identical to the optical-isolator elements shown in FIG. 1 which are connected in series with each interstage link. As will be detailed hereinafter, these elements function to determine the busy or idle state of each interstage link. More specifically, when a particular interstage link, such as interstage link A1 is busy (i.e., is being used to establish a line to trunk connection), there exists a DC current flow through interstage link A1 and light-emitting diode D108 of sufficient magnitude to forward bias diode 108. Light-emitting diode 108, in response to the DC current flow, emits light which is detected by phototransistor T108. In response thereto, phototransistor T108 is turned ON. Such optical-isolator elements are well known in the art and could, for example, be Optical-Isolator 4N25 manufactured by Motorola, Inc.

The multistage switching network illustrated in FIG. 1 and FIG. 2 functions to establish an audio path between any one of incoming lines L1 through L32 and any one of outgoing trunks T1 through T32 via the various crosspoint groups and interstage links. Two types of information are needed in order to establish such a connection. First, the incoming line and the outgoing trunk for which a connection is desired must be identified. Second, an idle path between the designated line and trunk must be found. Apparatus for identifying the particular line and trunk for which a connection is desired is well known in the telephone switching art. (See for example, "No. 1 ESS Scanner, Signal, Distributor and Central Pulse Distributor" by Freimanis, Guercio and May, *Bell System Technical Journal*, Sept. 1964, No. 5, Part 2.) Such apparatus functions to detect which of incoming lines L1 through L32 are requesting service and to provide a binary address identifying the crosspoint group in which the designated line is terminated. Similarly, such apparatus determines to which outgoing trunk the connection is to be made and provides a binary address identifying the crosspoint group in which the outgoing trunk is terminated. Apparatus capable of generating a line and trunk crosspoint group address is illustrated in simplified block diagram form in FIGS. 3 and 4. As such apparatus is not part of this invention and is well known in the art, it will not be described further.

Figure 3:
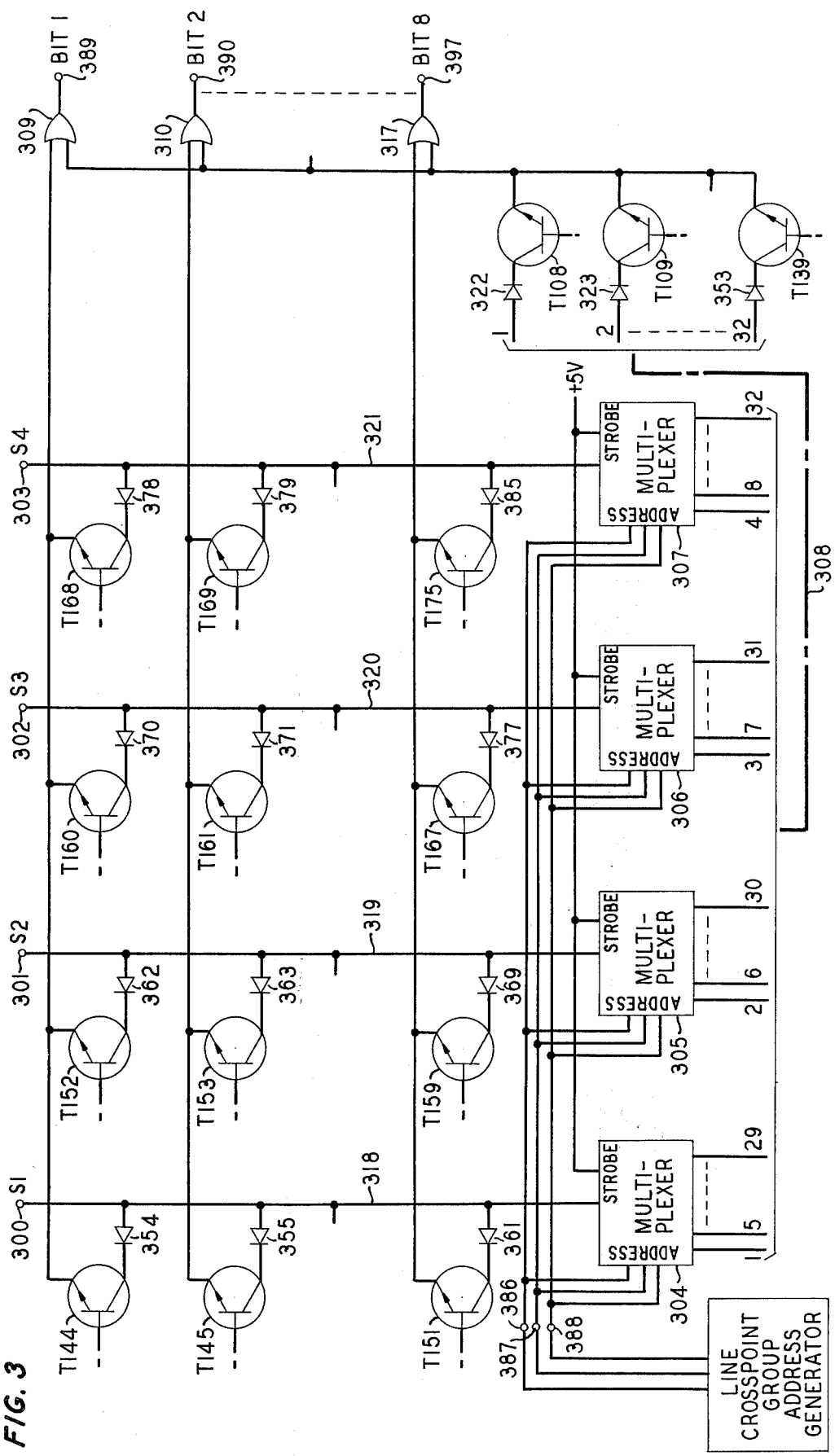
FIGS. 3, 4 and 6 disclose the circuit details of the path selection circuitry in accordance with this invention.
Figure 4:
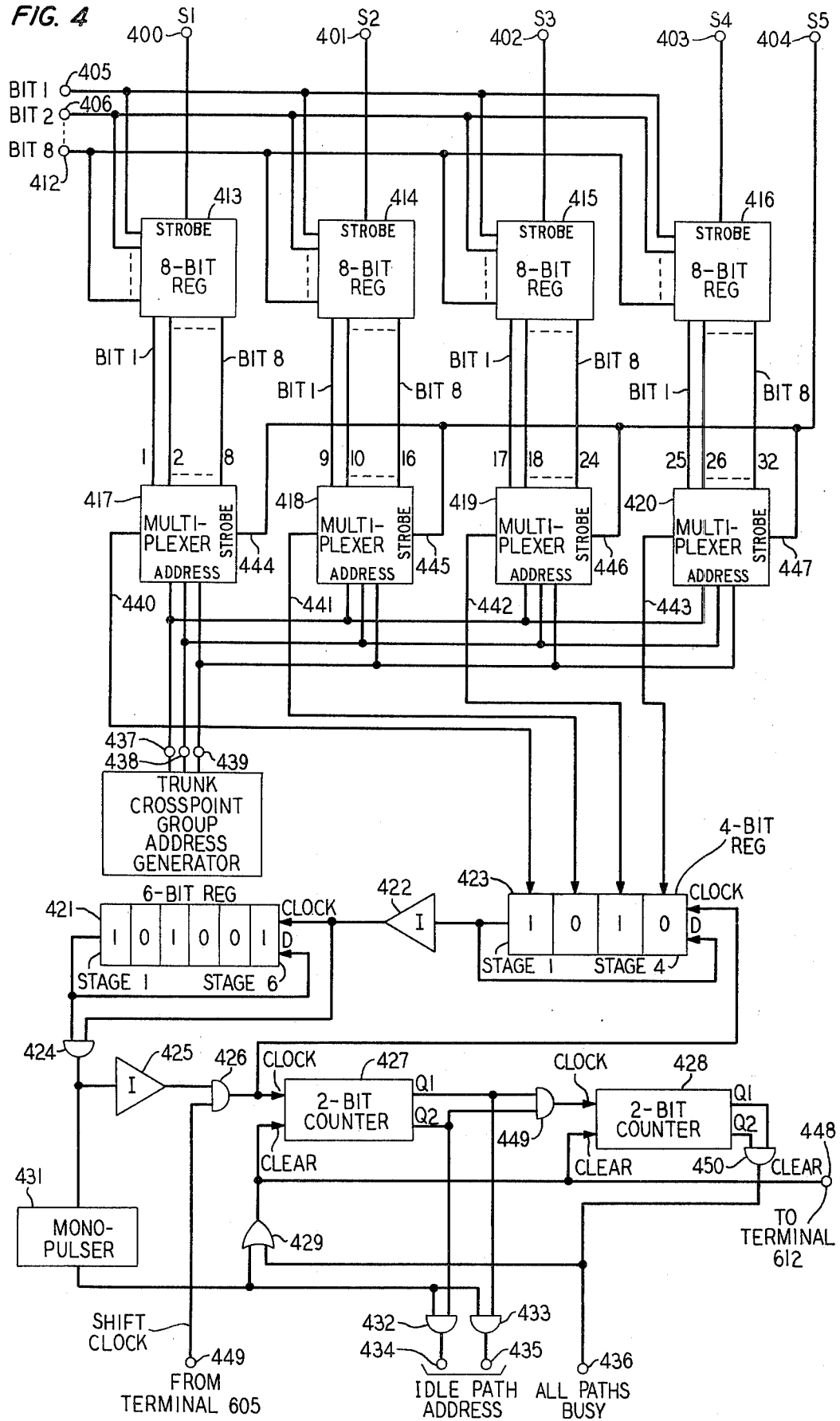

Given a binary address identifying a particular line and a particular trunk for which a connection is desired, the remaining information necessary to establish a connection is the location of an idle path between the designated line and trunk. To obtain this information, it is necessary to identify the state (busy or idle) of each of the interstage links capable of forming a connection between the designated line and trunk, and thereafter to select certain of those interstage links to form a path between the line and the trunk. The apparatus necessary to identify idle interstage links is shown in FIG. 3 and the apparatus necessary to select certain of these interstage links in a pseudorandom manner is shown in FIG. 4. Both the identification process and the pseudorandom path selection process will be described in detail hereinafter in conjunction with FIGS. 3 and 4.

Assume for example, that it is desired to complete a connection between line L1 and trunk T32. As can be determined from FIG. 1, there are four possible sets of interstage links capable of forming a connection between line L1 and trunk T32. These four sets of interstage links include interstage links A1–B8, A2–B16, A3–B24 and A4–B32. Connected in series with these interstage links are the optical-isolator elements associated therewith. For example, connected in series with interstage links A1–B8 are optical-isolator elements 108 and 151. Similarly connected in series with interstage links A2–B16 are optical-isolator elements 109 and 159, connected in series with interstage links A3–B24 are optical-isolator elements 110 and 167 connected in series with interstage links A4–B32 are optical-isolator elements 111 and 175. As described above, each optical-isolator element detects the busy or idle state of the interstage link associated therewith and in response thereto the phototransistor included in the optical-isolator element assumes an ON condition in response to a busy interstage link and an OFF condition in response to an idle interstage link. Therefore in order to determine which interstage links are idle and which interstage links are busy, it is necessary to determine the state of the various phototransistors included in the optical-isolator elements. The manner in which this is accomplished is detailed hereinafter.

Refer to FIG. 3. Therein is shown phototransistors T144 through T175, phototransistors T108 through T139, multiplexers 304 through 307 and OR gates 309 through 317. Phototransistors T144 through T175 are the phototransistors included in the optical-isolator elements connected in series with the B set of interstage links as shown in FIG. 1. Phototransistor T144, for example, is the phototransistor included in optical-isolator element 144 connected in series with interstage link B1 (FIG. 1). Therefore, the busy or idle state of interstage link B1 is reflected by the ON or OFF state of phototransistor T144. Similarly, the busy or idle state of interstage link B2 is reflected by the ON or OFF state of phototransistor T145, etc. Phototransistors T144 through T175, reflecting the busy or idle status of the entire B set of interstage links are arranged into an array form as is shown in FIG. 3. More specifically, phototransistors T144 through T151 form one column of the array in FIG. 3, and reflect the busy or idle status of the B interstage links extending from crosspoint group 140 (FIG. 1) to each and every crosspoint group in the output switching stage in the switching network shown in FIG. 1. Similarly, phototransistors T152 through T159 form the second column in the array in FIG. 3 and reflect the busy or idle status of the B interstage links extending from crosspoint group 141 in FIG. 1. The remaining two columns in the array in FIG. 3 in turn reflect the busy or idle status of the B interstage links extending from crosspoint groups 142 and 143, respectively.

Phototransistors T108 through T139 shown in FIG. 3 are the phototransistors included in the optical-isolator elements connected in series with the A set of interstage links shown in FIG. 1. Therefore, the ON or OFF condition of phototransistors T108 through T139 reflect the busy or idle status of the A set of interstage links shown in FIG. 1.

Multiplexers 304 through 307 function to connect input lines 318 through 321 to certain of output lines 1 through 32 in response to a logical 1 applied to the STROBE inputs of the multiplexers and to a 3-bit address applied to the address inputs of the multiplexers. (Note that the STROBE inputs of multiplexers 304 through 307 are connected to a constant logical 1 state.) More specifically, a 3-bit binary address defining a line crosspoint group is applied to input terminals 386 through 388. In response thereto, multiplexers 304 through 307 connect input lines 318 through 321 to selective ones of output lines 1–32 defined by the line crosspoint group address. Thus, for example, if a 3-bit binary address defining crosspoint group 100 in FIG. 1 were applied to multiplexers 304 through 307, input line 318 would be connected to output line 1, input line 319 would be connected to output line 2, input line 320 would be connected to output line 3, and input line 321 would be connected to output line 4. Similarly, if a 3-bit binary address defining crosspoint group 101 was applied to terminals 386 through 388, input line 318 would be connected to output line 5, input line 319 would be connected to output line 6, input line 320 would be connected to output line 7, and input line 321 would be connected to output line 8. A similar pattern is followed by multiplexers 304 through 307 in response to the application to terminals 386 through 388 of 3-bit binary addresses defining the remaining line crosspoint groups. The multiplexer output lines 1 through 32 are connected via cable 308 and isolation diodes 322 through 353 to the emitter inputs of phototransistors T108 through T139. Therefore, multiplexer output line 1 is connected to the emitter of phototransistor T108 whose ON or OFF state in turn reflects the busy or idle state of interstage link A1. Similarly, output line 2 is connected to the emitter of phototransistor T109, etc. Multiplexers 304 through 307 are well known in the art and could for example be Data Select Multiplexer 133D manufactured by Western Electric Company, Incorporated.

As described above, the various phototransistors shown in FIG. 3 reflect the busy or idle status of the A set and B set of interstage links shown in FIG. 1. Therefore, to determine which interstage links are busy or idle for a given line and trunk it is necessary to determine the ON or OFF state of the phototransistors shown in FIG. 3. This is accomplished with the circuitry shown in FIG. 4 and the circuitry shown in FIG. 6. Refer to FIG. 6. The circuitry shown therein is used to generate the various waveforms illustrated in FIG. 5. A free-running systems clock is applied to terminal 606 and in turn to one input of gate 603 and to the CLK input of 10-bit register 601. A logical 1 applied to the D input of register 601 via START terminal 604 functions as a START pulse by placing a 1 into stage one of register 601. The START pulse can be generated in any suitable manner and could, for example, be generated by a simple switch closure as is shown in FIG. 6. The logical 1 is then shifted through the various stages of register 601, generating pulses S1 through S5, shown in FIG. 5. The S1 through S5 pulses are applied to output terminals 607 through 611. The logical 1 bit reaching the last stage of register 601 is then used to place flip-flop 602 in the SET state thereby enabling gate 603 and applying the systems clock to output terminal 605 where it is designated as a SHIFT CLOCK and applied to terminal 449 in FIG. 4.

The manner of determining the busy or idle status of the interstage links by interrogating the ON or OFF state of the phototransistors in FIG. 3 will now be described in detail. Assume that it is desired to establish a connection between line L1 and trunk T32 in FIG. 1. As described above, there are four possible pairs of interstage links capable of forming a connection between line L1 and trunk T32. Therefore, in order to determine which of these interstage links are idle, it is necessary to interrogate the ON or OFF state of the various phototransistors associated with these interstage links.

The interrogation begins with the line and trunk crosspoint group address generator supplying a 3-bit binary address to identify the line crosspoint group and the trunk crosspoint group in which the selected incoming line and outgoing trunk are terminated. The line crosspoint group address is applied to terminals 386, 387 and 388 in FIG. 3 and in turn to multiplexers 304 through 307. The trunk crosspoint group address is applied to terminals 437, 438 and 439 in FIG. 4 and in turn to multiplexers 417 through 420 in FIG. 4. Multiplexers 417 through 420 are identical to multiplexers 304 through 307 in FIG. 3 and function to connect one of input lines 1 through 32 defined by the 3-bit trunk address to one of output lines 440, 441, 442 or 443. As described above, for multiplexers 304 through 307, the connection completed by multiplexers 417 through 420 is completed in response to a logical 1 applied to the strobe inputs of the various multiplexers. Subsequent to the application of the line crosspoint group address and the trunk crosspoint group address to the terminals described above, a START pulse is applied to terminal 604 in FIG. 6. Register 601 in response to the START pulse, generates pulses S1 through S5 described above.

Pulse S1 is applied to terminal 300 in FIG. 3 and to terminal 400 in FIG. 4. Pulse S1 applied to terminal 300 in FIG. 3 is in turn applied to isolation diodes 354 through 361 and to multiplexer 304. Recall from what precedes that phototransistors T144 through T151 reflect the busy or idle status of interstage links B1 through B8 in FIG. 1 and a phototransistor will be in the ON state if the corresponding interstage link is busy and in the OFF state if the corresponding interstage link is idle. Therefore, pulse S1 applied to isolation diodes 354 through 361 will be gated through those of phototransistors T144 through T151 which are in the ON state due to the respective interstage link currently being busy. Therefore a logical 1 is applied to one input of those OR gates 309 through 317 which are connected to the emitter of a phototransistor which is in the ON state.

The S1 pulse is also applied to multiplexer 304. As previously described, the line crosspoint group address applied to multiplexer 304 serves to connect line 318 to line 1. Therefore, pulse S1 is applied to the base of isolation diode 322 via multiplexer 304, line 1, and cable 308. Recall that phototransistors T108 through T139 reflect the busy or idle state of the A set of interstage links and in particular phototransistor T108 reflects the busy or idle state of interstage link A1. Therefore, if interstage link A1 is currently in the busy state, pulse S1 will be gated through phototransistor T108 and applied to the remaining inputs of OR gates 309 through 317.

The result of the application of pulse S1 to terminal 300 is therefore the generation of 8 binary bits presented to output terminals 389 through 397. This 8-bit binary word reflects the busy or idle state of interstage link A1 and interstage links B1 through B8. More particularly, bit 1 in the binary word reflects the state of a path through the network consisting of interstage links A1–B1, bit 2 reflects the state of links A1–B2, bit 3 reflects the state of links A1–B3, etc. The value of each bit in turn reflects the busy or idle state of each path with a logical 0 indicating that the path is idle and a logical 1 indicating that one or both links in the path is busy. Therefore, if for example, either one of interstage links A1 or B1 is busy, a logical 1 will be presented to output terminal 389. Similarly, if either of links A1 or B2 is busy, a logical 1 will be presented to output terminal 390, etc. The 8-bit binary word presented to output terminals 389 through 397 is in turn applied to input terminals 405 through 412 in FIG. 4, and in turn, to registers 413 through 416. (Registers 413 through 416 are parallel-in — parallel-out 8-bit registers. Such registers are well known in the art and therefore will not be described further.) Pulse S1 applied to terminal 400 is also applied to the STROBE input of register 413 which gates the 8-bit word generated as a result of pulse S1 into register 413. the Pulse S2 generated subsequent to pulse S1 is applied to terminal 301 in FIG. 3 and to terminal 401 in FIG. 4. Pulse S2 is gated through those phototransistors T152 through T159 that are in the ON state, through multiplexer 305, line 2, cable 308, and to the base of phototransistor T109. In so doing, pulse S2 generates a second 8-bit binary word which is presented to output terminals 389 through 397 and in turn is applied to input terminals 405 through 412 from which the second 8-bit binary word is stored in register 414. The second 8-bit word reflects the busy or idle status of interstage links A2 and B9 through B16 in the same manner that has been described above for the first 8-bit binary word. More particularly, bit 1 of the second 8-bit word reflects the status of path A2–B9, bit 2 reflects the state of path A2–B10, bit 3 reflects the state of path A2–B11, etc.

Pulse S3 is generated subsequent to pulse S2 and is applied to terminal 302 in FIG. 3 and to terminal 402 in FIG. 4. Pulse S3 generates a third 8-bit word in the same manner as has been described above and gates the word into register 415. The third 8-bit word reflects the busy or idle status of interstage links A3 and B17 through B24. Pulse S4 is generated subsequent to pulse S3 and generates a fourth 8-bit word which is stored in register 416. The fourth 8-bit word reflects the busy or idle status of interstage links A4 and B25 through B32.

Subsequent to the generation of pulse S4 therefore, there are stored in registers 413 through 416 four 8-bit words. The 32 bits of which these four words are comprised collectively reflect the busy or idle status of interstage links A1 through A4 and B1 through B32. More particularly, word 1 indicates the status of a path extending from line crosspoint group 100, via link A1 and crosspoint group 140 to each trunk crosspoint group 176 through 183 via links B1 through B8. Word 2 indicates the status of a path extending from line crosspoint group 100 via link A2 and crosspoint group 141 to each trunk crosspoint group 176 through 183 via links B9 through B16. Word 3 indicates the status of a path extending from line crosspoint group 100 via link A3 and crosspoint group 142 to each trunk crosspoint group 176 through 183 via links B17 through B24, and word 4 indicates the status of a path extending from line crosspoint group 100 via link A4 and crosspoint group 143 to each trunk crosspoint group 176 through 183 via links B25 through B32.

As described above, the connection currently being established is from line L1 to trunk T32. The four possible paths between these two points include links A1–B8, A2–B16, A3–B24 and A4–B32. The status information of these four paths is therefore a subset of the status information contained in the four 8-bit words stored in register 413 through 416. It is necessary therefore to extract 4 bits reflecting the status of the four paths in question from the four 8-bit words. This is accomplished in the following manner.

Figure 5:
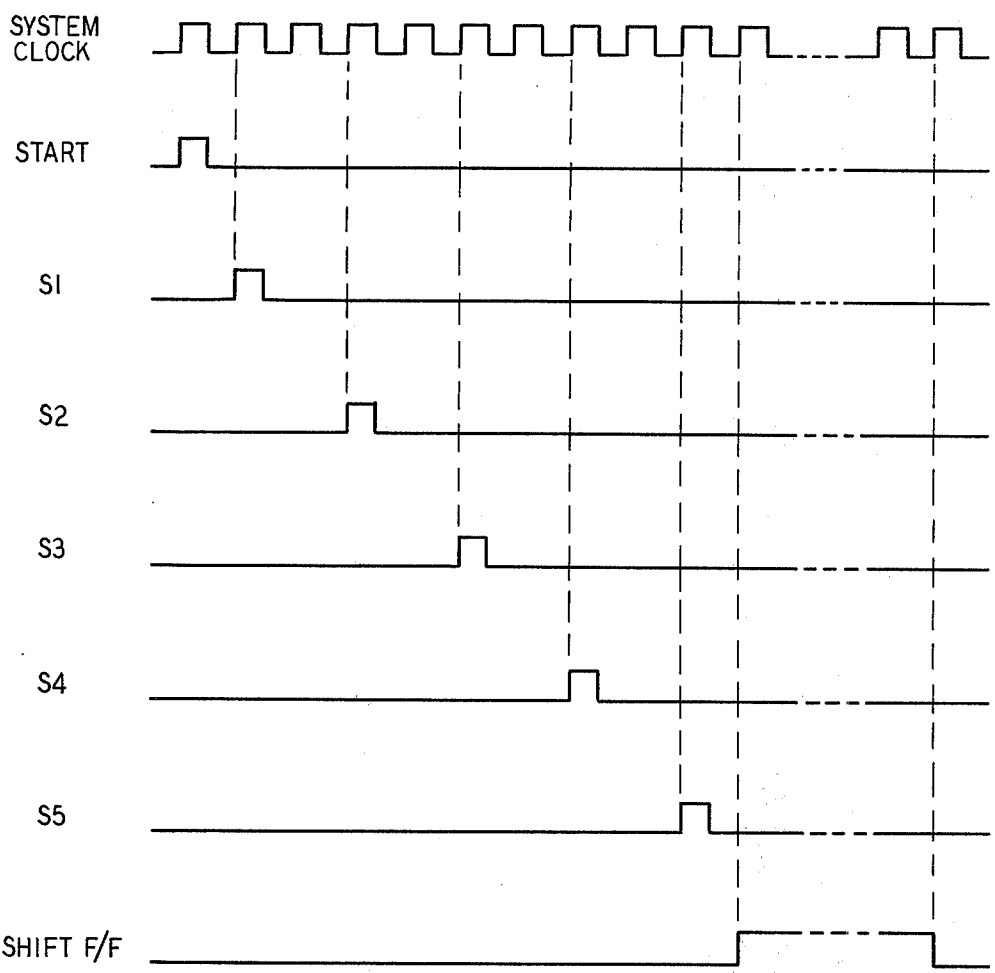
FIG. 5 discloses various waveforms generated by the path selection circuitry.
Figure 6:
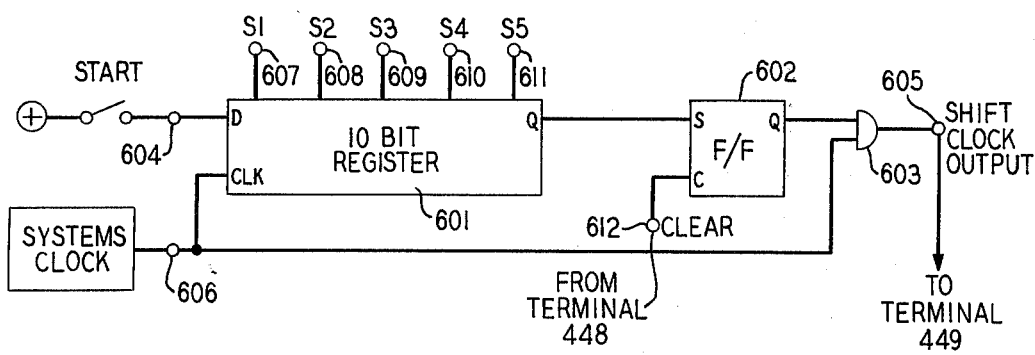

Pulse S5 is generated subsequent to pulse S4 as is indicated from FIG. 5. This pulse, applied to terminal 404 (FIG. 4) and in turn to the STROBE inputs of multiplexers 417 through 420 enables the multiplexers. Enabling the multiplexers gates the four 8-bit words stored in registers 413 through 416 to the inputs of multiplexers 417 through 420. As previously described, the trunk crosspoint group address has also been applied to terminals 437 through 439 and, in turn, to the multiplexers and functions to connect one of input lines 1 through 32 to the output lines 440 through 443 after the multiplexers are enabled. More particularly, the trunk crosspoint group address functions to extract from the 32 bits on lines 1 through 32, the four bits reflecting the status of the four paths terminating in the particular trunk crosspoint group whose address has been applied to multiplexers 417 through 420. In this example, the address applied to multiplexers 417 through 420 would be the address of trunk crosspoint group 183 (FIG. 1). In response thereto, multiplexer 417 would connect input line 8 to output line 440, multiplexer 418 would connect input line 16 to output line 441, multiplexer 419 would connect input line 24 to output line 442 and multiplexer 420 would connect input line 32 to output line 443. As a result, 4 bits would be stored in parallel-in — serial-out register 423. These four bits would be the eighth bit from each of the 8-bit words stored in registers 413 through 416. As previously described, the eighth bit of the 8-bit word in register 413 reflects the status of path A1–B8, the eighth bit of the 8-bit word in register 414 reflects the status of path A2–B16, the eighth bit of the 8-bit word in register 415 reflects the status of path A3–B24 and the eighth bit of the 8-bit word in register 416 reflects the status of path A4–B32. Therefore, subsequent to the generation of pulse S5, there is stored in register 423, 4 bits reflecting the status of the four possible paths through the network between incoming line L1 and outgoing trunk T32.

It is to be understood that the procedure outlined above would be followed to determine the status of the four paths between any incoming line and any outgoing trunk. From what precedes, it is clear that by merely applying the line and trunk crosspoint group address to terminals 386 through 388, and terminals 437 through 439, respectively, and by applying a START pulse to terminal 604 in FIG. 6, the circuitry in FIGS. 3, 4 and 6 will generate and store in register 423 the four bits reflecting the status of the four paths between the addressed line and trunk.

Given the storage in register 423 of the 4 bits reflecting the status of the 4 possible paths through the network, it is now necessary to select one of these paths to complete the connection between the designated line and trunk. Path selection is advantageously accomplished in a pseudorandom manner with the circuitry in FIG. 4.

A pseudorandom path selection method is accomplished by having the path selector in FIG. 4 operate in three different modes. In the first mode of operation, the path selector selects the first available idle path, in the second mode of operation the path selector selects the second available idle path, and in the third mode of operation, the path selector selects the third available idle path. More particularly, pseudorandom path selection is accomplished with the bit pattern 101001 stored in register 421. As will be detailed hereinafter, the first available idle path of the four possible paths through the network will be selected each time a logical 1 bit is stored in stage 1 of register 421. Also, each time an idle path is detected among the four possible paths through the network, the bits in register 421 are shifted cyclically one bit to the left. Therefore, it can be seen that with the pattern 101001 currently stored in register 421, the first time an idle path is detected it will be selected to complete the connection through the network. At this time the bit pattern in register 421 will be shifted cyclically one position to the left resulting in the storage of the pattern 010011 in register 421. As a logical 0 bit is now stored in stage 1 of register 421, followed by a 1 bit, it can be seen that the next time path selection is attempted, the second available idle path will be selected, i.e., the first idle path detected will be passed over but the bit pattern in register 421 will be shifted one position to the left. This places a 1 bit in stage 1 of register 421 so that the next or second idle path detected will be selected, and the bit pattern in register 421 will be shifted one more position to the left resulting in the storage of the pattern 001101 in register 421. Now a logical 0 bit is stored in stage 1 followed by another 0 bit and then a 1 bit. From the aforementioned description, it can be seen that the third available idle path will now be selected, at which time the bit pattern in register 421 will be returned to its original position and the pattern will be repeated.

Assume that the bit pattern 1010 is stored in register 423. As described above, such a pattern indicates the busy or idle status of the four possible paths through the network for a particular line and trunk. More particularly, for line L1 and trunk T32, the pattern 1010 indicates that path A1–B8 is busy, path A2–B16 is idle, path A3–B24 is busy and path A4–B32 is idle. Assume also that registers 427 and 428 are initially in the CLEAR state. The 1 in stage 1 of register 423 causes the output of inverter 422 to go low, disabling gate 424 and applying a low to the input of inverter 425. In response thereto, gate 426 is enabled, applying the shift clock pulse train from FIG. 6 to the clock input of registers 427 and 423. Register 427 is thus clocked to the state 01 and the bit pattern in register 423 (1010) is shifted one position to the left such that a 0 bit is applied to the input of inverter 422, causing the output of inverter 422 to go high. As described above, the presence of a 0 bit in register 423 indicates the existence of an idle path through the network. This therefore is the first idle path detected in the pattern 1010 and will be selected in the following manner.

In response to the output of inverter 422 going high, gate 424 is enabled, disabling gate 426 via inverter 425 and monopulser 431 is toggled. The output of inverter 422 going high also clocks register 421 thereby shifting the bit pattern stored therein one position to the left. Toggling monopulser 431 indicates the selection of an idle path and does two things. First, gates 432 and 433 are enabled applying the count stored in register 427 to output terminals 434 and 435. Second, toggling monopulser 431 provides a CLEAR pulse as will be detailed hereinafter.

The count stored in register 427 provides a unique indication of the path that has been selected by the circuitry in FIG. 4. The unique indication is provided by having the count in register 427 reflect the position of the bit pattern in register 423. As described above, each time the bit pattern in register 423 is shifted one position to the left, a toggle pulse is applied to the CLK input of register 427. Therefore, the count in register 427 reflects the number of times the bit pattern in register 423 has been shifted to the left before path selection is made. For example, in the path selection described above, the bit pattern in register 423 was shifted one position to the left before path selection was made. Therefore, the count stored in register 423 is equal to 1 indicating that the second bit in register 423 resulted in path selection. Similarly, if the first bit in register 423 had resulted in path selection a count of 0 would be stored in register 427, if the third bit in register 423 had resulted in path selection, a count of 2 would be stored in register 427, and if the fourth bit in register 427 had resulted in path selection, a count of 3 would be stored in register 427. Therefore, the count stored in register 427 when applied to output terminals 434 and 435 by monopulser 431 provides a unique indication of the path that has been selected. In this example, a count of 1 indicates the selection of the second bit in the pattern stored in register 423 and, as described above, this bit indicates that path A2–B16 is idle. Similarly, a count of 2 would indicate that path A3–B24 is idle, a count of 3 would indicate that path A4–B32 is idle, and a count of 0 would indicate that path A1–B16 is idle. Therefore, apparatus which is not part of this invention can use the unique count applied to output terminals 434 and 435 to determine which path is idle and available to complete the connection between the predetermined line and trunk. As such apparatus is not part of the invention described herein, it will not be discussed further.

Toggling monopulser 431 also provides a CLEAR pulse via gate 429. This pulse clears register 427, 428 and flip-flop 602 in FIG. 6, thereby preparing the circuitry to select the next idle path as has been described above.

The procedure described above discussed the first mode of pseudorandom path selection, namely the selection of the first available idle path. The second mode of pseudorandom path selection, the selection of the second available idle path will now be described. As described above, the selection of the first available idle path resulted in shifting the bit patter in register 421 one position to the left. Therefore, the bit pattern now stored in register 421 is 010011. Assume now that the idle paths between line L1 and trunk T32 have been determined in the manner described above and the bit pattern stored in register 423 is 1010, indicating paths A2–B16 and A4–B32 are idle. Previously, the first available idle path A2–B16 was selected. Now in the second mode of pseudorandom path selection, the second available idle path will be selected.

The bit pattern 1010 stored in register 423 applies a high to the input of inverter 422, causing the output of inverter 422 to apply a low to one input of gate 424. The remaining input of gate 424 is also low due to the bit pattern 010011 stored in register 421. Therefore, the output of gate 424 is low, and the output of inverter 425 is high enabling gate 426. in response thereto, the shift clock pulse train is applied to the clock inputs of register 427 and 423, thereby shifting the bit pattern in register 423 one position to the left, and clocking register 427 to the count of 1. The 0 bit now in stage 1 of register 423 causes the output of inverter 422 to go high applying a high to one input of gate 423. The presence of the 0 bit indicates the detection of idle path A2–B16. However, the 0 bit in stage 1 of register 421 keeps the gate 424 disabled. Therefore, monopulser 431 is not toggled and path A2–B16 is not selected. The output of inverter 422 going high, however, clocks register 421 and shifts the bit pattern stored therein one position to the left. The pattern in register 421 is now 100110. As gate 424 is disabled, gate 426 is enabled allowing the shift clock pulse train to clock counter 427 to the count of 2 and to shift the bit pattern in register 423 one additional position to the left so that the bit pattern in register 423 is now 1010. The output of inverter 422 therefore goes low maintaining gate 424 in a disabled state. The next shift clock pulse clocks counter 426 to a count of 3 and shifts the bit pattern in register 423 to 0101. The output of inverter 422 therefore goes high, applying a high to one input of gate 424. The remaining input of gate 424 is also high to the bit pattern 100110 stored in register 421. Therefore the output of gate 424 goes high disabling gate 426 via inverter 425 and toggling monopulser 431. The output of inverter 422 going high also shifts the bit pattern in register 421 to 001101. Toggling monopulser 431 signifies the selection of an idle path and as described above gates the contents of register 427 to output terminals 434 and 435 via gates 432 and 433. The contents of register 427 are now equal to a count of 3 which will be interpreted by apparatus which is not part of this invention to indicate that the path A4–B32 has been selected to complete the connection between line L1 and trunk T32. Toggling monopulser 431 also clears register 427, 428 and flip-flop 602 as described above.

Therefore, as is clear from the previous description, the second mode of pseudorandom path selection selected the second available idle path A4–B32, rather than the first available idle path A2–B16, which was selected in the first mode. The next mode will select the third available idle path. This can be seen from the bit pattern now stored in register 421 which is 001101. The two leading 0 bits followed by a 1 bit indicate that two idle paths will be detected and not selected before the third idle path is selected. As this procedure follows logically from the procedure described above, it will not be described further.

The remaining function performed by the logic in FIG. 4 is an indication that all paths through the network for a particular line and trunk are busy. When all paths are busy, the bit pattern stored in register 423 will be 1111. The absence of 0 bits in this pattern indicates that all four possible paths between a particular line and trunk are busy. The absence of 0 bits in this pattern will also prevent the output of inverter 422 from going high while the bit pattern is shifted through register 423 in the anner described above. Therefore, the bit pattern will continue to be shifted through register 423 as the shift clock pulse train clocks counter 427. When counter 427 reaches the count of 3 (i.e. $11_2$), the Q1 and Q2 outputs of counter 427 will go high. At this time also the bit pattern in register 423 will have been shifted once completely through register 423. The Q1 and Q2 outputs of register 427 going high enables gate 449 which in turn clocks counter 428 to the count of 1. Counter 427 will continue to be clocked by the shift clock pulse train and the bit pattern in register 423 will continue to be shifted to the left. When counter 427 again reaches the count of 3, the bit pattern in register 423 will have been shifted twice completely through register 423 and the Q1 and Q2 outputs of counter 427 will again go high. Gate 449 is thereby enabled clocking counter 428 to the count of 2. When counter 428 reaches the count of 3, the Q1 and Q2 outputs of counter 428 go high enabling gate 450 and applying a high to output terminal 436 and generating a CLEAR pulse via gate 429 as described above. The positive pulse applied to output terminal 436 provides an indication that all four paths between a particular line and trunk are busy. This indication can then be used by apparatus which is not part of this invention to provide a signal to the customer attempting to establish a connection that all paths are busy and the attempted connection should be retried at a later time.

Although a specific embodiment of this invention has been shown and described, it will be understood that various modifications may be made without departing from the spirit of this invention.

We claim:

1. A switching network, including an input switching stage, at least one intermediate switching stage and an output switching stage, a plurality of interstage links connected between adjacent switching stages, means for indicating the busy and idle state of each interstage link and means responsive to the indicating means for identifying idle paths between a particular incoming path terminating on the input stage and a particular outgoing path terminating on the output stage, characterized in that the switching network further includes means for forming a pseudorandom pattern of binary bits consisting of a predetermined number of portions, means responsive to the identifying means and to a first portion of the pseudorandom pattern for selecting a first idle path identified by the identifying means, means responsive to the identifying means and to a second portion of the pseudorandom pattern for rejecting the first idle path identified and for selecting a second idle path identified by the identifying means and means responsive to the identifying means and to a third portion of the pseudorandom pattern for rejecting the first and second idle paths identified and for selecting a third idle path identified by the identifying means.

2. A switching network, including an input switching stage, at least one intermediate switching stage and an output switching stage, a plurality of interstage links connected between adjacent switching stages, means for indicating the busy and idle state of each interstage link, and means responsive to the indicating means for generating a first multibit binary word, each bit in the binary word defining the busy and idle state of a path extending from the input switching stage to the output switching stage of the switching network, characterized in that the switching network further includes means for forming a pseudorandom pattern of binary bits consisting of a predetermined number of portions, means for identifying bits in the first multibit binary word indicative of idle paths through the switching network, and means responsive to the predetermined portions of the pseudorandom bit pattern and to the identifying means for selecting successively different ones of the idle paths extending from the input switching stage to the output switching stage of the switching network.

3. A switching network in accordance with claim 2 wherein the selecting means includes means responsive to a first portion of the pseudorandom pattern for selecting a first idle path identified by the identifying means, responsive to a second portion of the pseudorandom pattern for rejecting the first idle path identified and for selecting a second idle path identified by the identifying means, and responsive to a third portion of the pseudorandom pattern for rejecting the first and second idle paths identified and for selecting a third idle path identified by the identifying means.

4. A switching network in accordance with claim 3 wherein each busy interstage link carries a predetermined amount of current flow, the indicating means including means associated with each interstage link and responsive to the current flow for emitting light and binary means associated with each interstage link and optically coupled to each of the emitting means for assuming a first state in response to the presence of light and a second state in response to the absence of light.

5. A switching network in accordance with claim 4 wherein a first set of interstage links is connected between the input switching stage and the intermediate switching stage and a second set of interstage links is connected between the intermediate switching stage and the output switching stage, the switching circuit further including means for interrogating a predetermined subset of the binary means associated with the second set of interstage links and a predetermined one of the binary means associated with the first set of interstage links, and means responsive to the interrogating means for forming a second multibit binary word indicative of the logical state of the predetermined subset of the binary means and for forming a single binary bit indicative of the logical state of the predetermined one of the binary means.

6. A switching network in accordance with claim 5 further including means for logically combining the single binary bit with each and every bit of the second multibit binary word, the generating means including means responsive to the combining means for generating the first multibit binary word.

7. A switching network in accordance with claim 2 further including means for examining each bit in the first multibit binary word a predetermined number of times and means responsive to the failure of detecting an idle path within the predetermined number of times for indicating the unavailability of an idle path from the input switching stage to the output switching stage of the switching network.

8. A bit selection circuit, comprising, means for examining a plurality of binary bits and for detecting all binary bits of the same binary state from among the plurality of binary bits, means for generating a multibit binary word consisting of a predetermined number of portions, means responsive to a first one of the portions of the binary word for selecting the first binary bit detected by the examining and detecting means during a first examination, means responsive to a second one of the portions of the binary word for rejecting the first binary bit detected and for selecting the second binary bit detected by the examining and detecting means during a second examination, and means responsive to a third one of the portions of the binary word for rejecting the first and second binary bits detected and for selecting the third binary bit detected by the examining and detecting means during a third examination.

9. A bit selection circuit in accordance with claim 8 further including means for detecting a predetermined number of examinations of the binary bits by the examining and detecting means, and means responsive to the detecting means and operative upon the completion of the predetermined number of examinations for indicating the absence of binary bits of a predetermined binary state from among the plurality of binary bits.

10. A method of selecting an idle path between a predetermined line of an input switching stage and a predetermined trunk of an output switching stage of a multistage switching network, the method comprising the steps of:

identifying the busy and idle state of all possible paths between the line and the trunk, forming a pseudorandom pattern of binary bits consisting of a predetermined number of portions, and selecting successively different ones of the identified idle paths extending between the line and the trunk in response to predetermined portions of the pseudorandom bit pattern.

* * * * *